Figure 9:
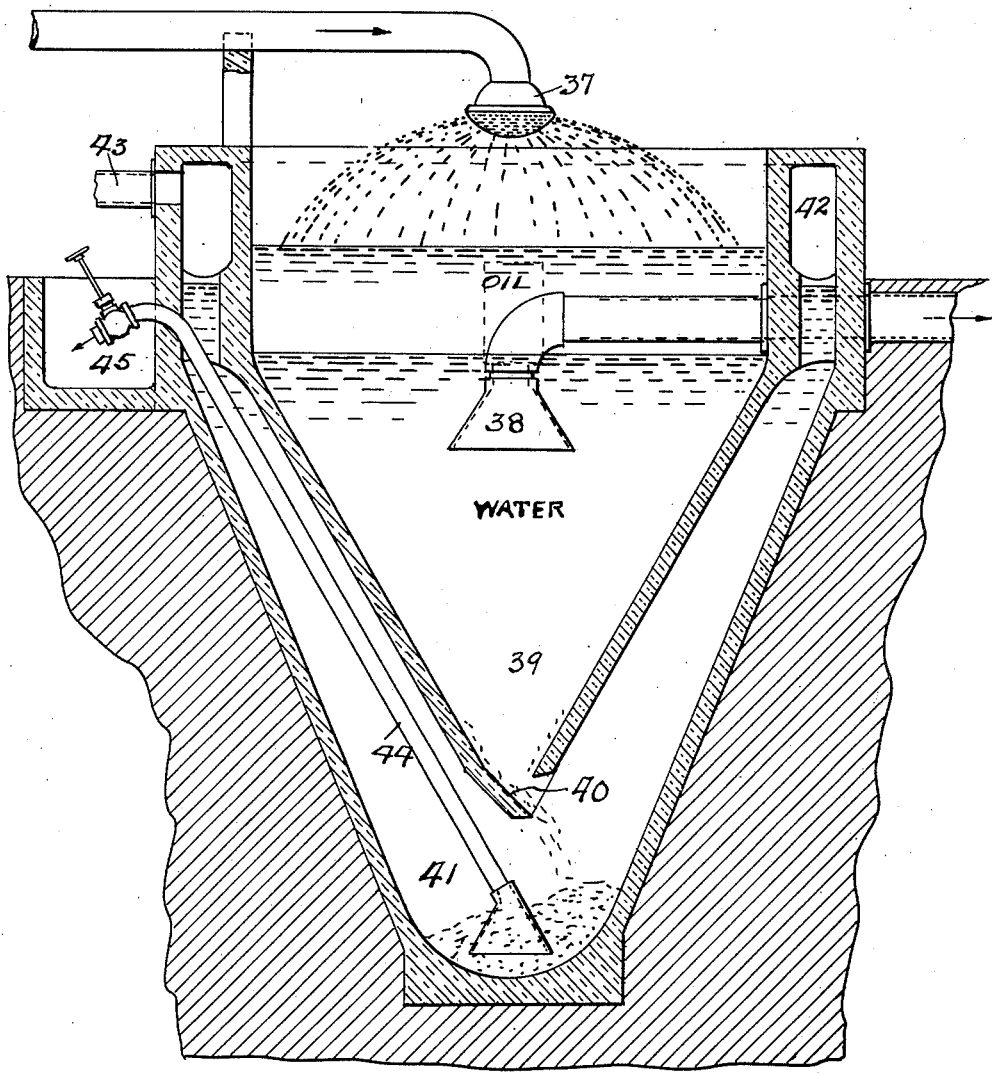

April 17, 1934.     C. G. HAWLEY     1,955,064
TENSIONAL SYSTEM OF PURIFICATION
Original Filed Jan. 24, 1929     3 Sheets-Sheet 1
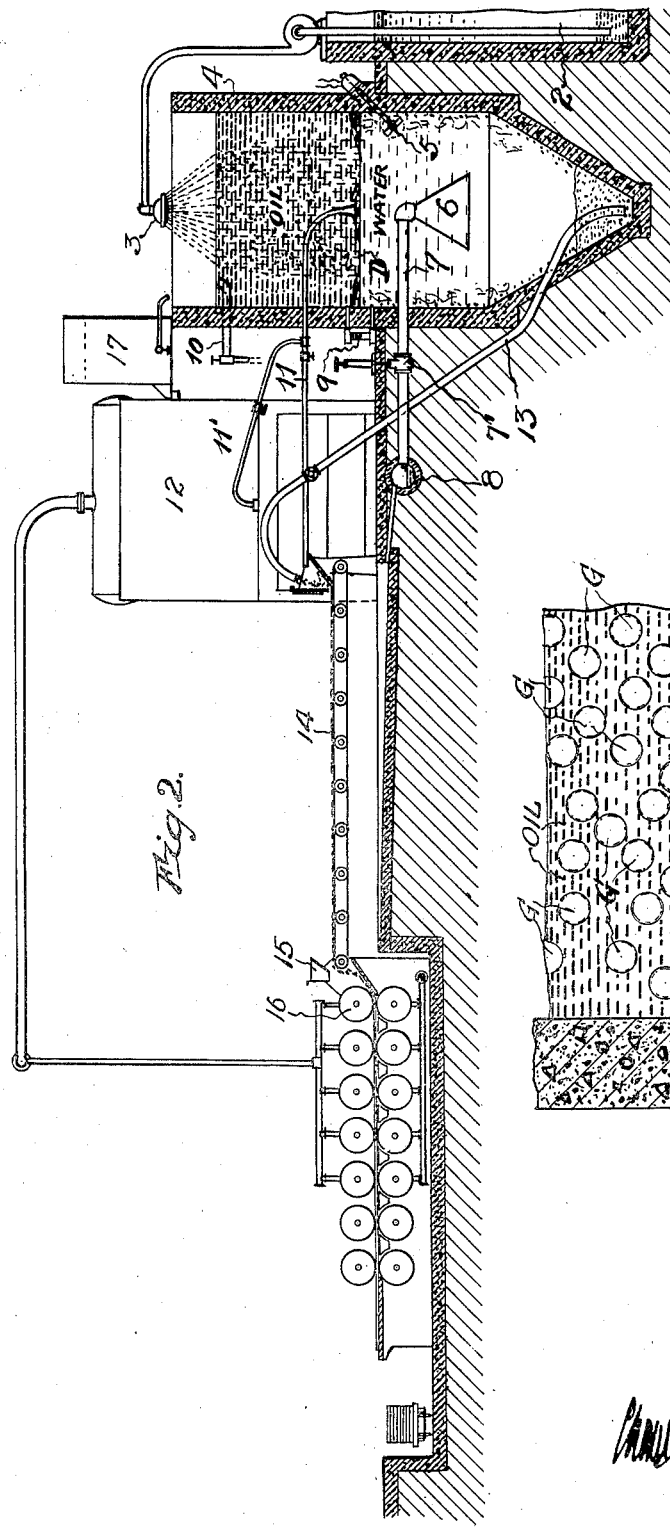
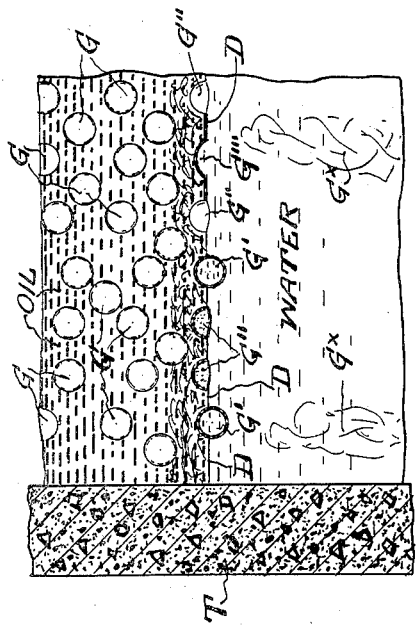
Inventor

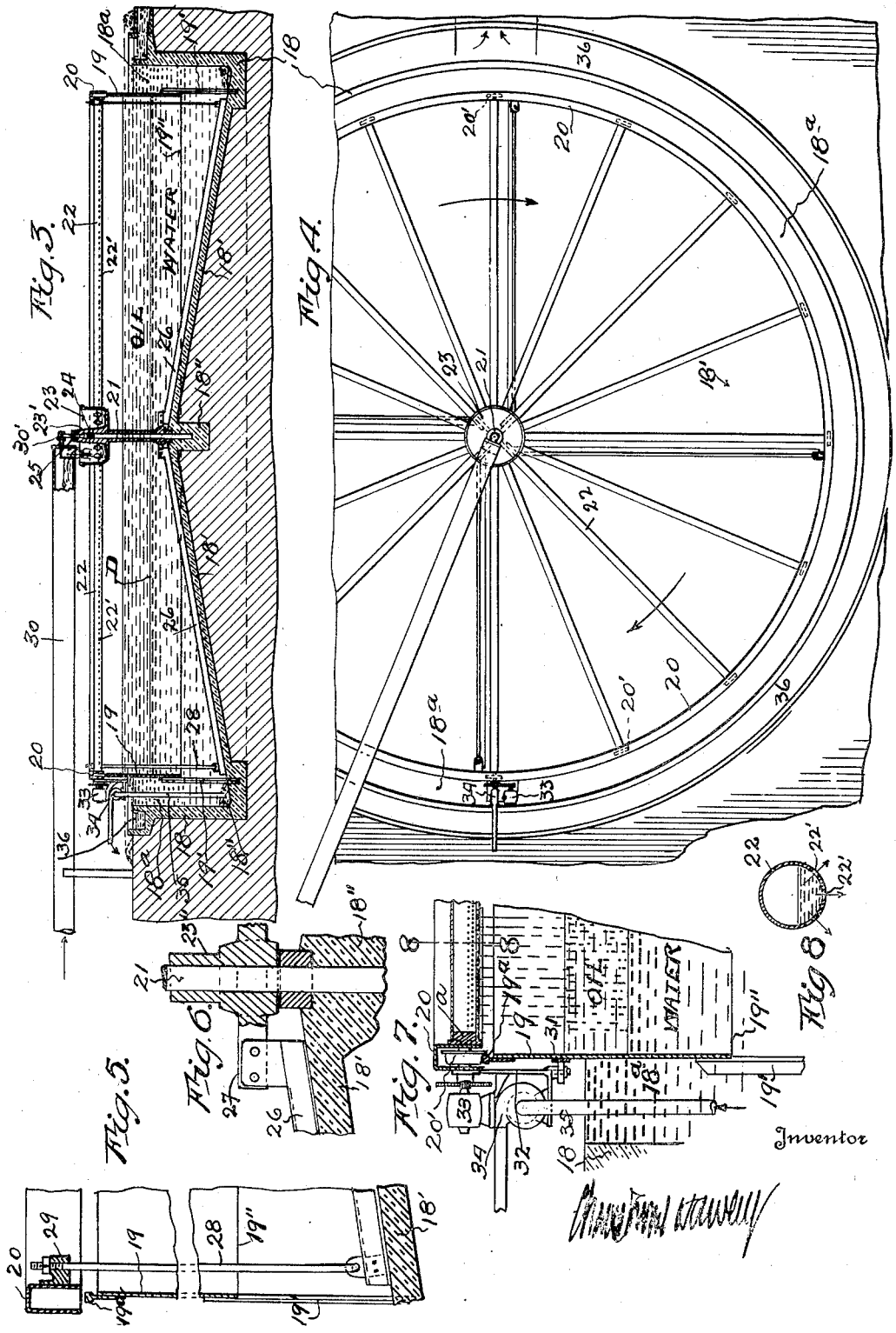

Patented Apr. 17, 1934

1,955,064

UNITED STATES PATENT OFFICE 1,955,064

TENSIONAL SYSTEM OF PURIFICATION

Charles Gilbert Hawley, Chicago, Ill.

Application January 24, 1929, Serial No. 334,721
Renewed December 8, 1933

7 Claims. (Cl. 210—2)

The invention comprises a sewage disposal system (process and apparatus) for the separation and consolidation of floatable, settleable and non-settleable impurities, and bacteria, from the carrying water of sewage, particularly sewage sludges; and, the invention involves the removal and final disposition of the products of such consolidation.

Primarily this is a sedimentation process of a continuous order or type but which is so modified that its effects and results somewhat resemble those accomplished in contact beds, trickling filters and septic tanks, and are secured more quickly and at less expense.

The objects of the invention are to accomplish the treatment of watery sludges, sewage and the like more expeditiously than has been possible hitherto; at less outlay for works construction and operation; and, to secure terminal products of higher value.

Considered from a physical standpoint a primary object of the invention is to accept a flowing stream of sewage or the like, to permit the stream to fall a short distance and during its virtually undeterred fall to promptly subject the impure liquid to a treatment which shall immediately consolidate the impurities; and to provide them for subsequent removal, meantime virtually excluding such impurities from a further supply of oxygen. Further and various structural features and objects of the invention will appear hereinafter.

Briefly, the invention proceeds by maintaining, within the lower part of a suitable tank, a standing body of the liquid under treatment and in floating upon its top a liquid body of less specific gravity. The impure liquid is minutely subdivided within the natant body and in the form of myriad globules sinks to the surface of the sub-natant liquid and in a purified state ultimately merges therewith. But meantime the dividing line between the natant and the sub-natant liquids becomes an effective disengagement surface where the globules are momentarily stopped, and there, utilizing the varying surface tensions of the differing liquids and organic and inorganic impurities, the several impurities are separated and substantially dewatered, consolidated and aggregated; and, in the main; very promptly sink to the bottom of the sub-natant body. Some impurities of the same or less specific gravity than the natant liquid are retained therein. Means are provided for decanting sub-natant liquid as made necessary by the addition of the influent; also means for separately removing the different impurities collected. And special means are provided for utilizing these impurities profitably.

As will become apparent, the preferred use of the recovered products, particularly in the case of sewage sludges, comprises the manufacture or conversion thereof into a paper-like product; a process which involves sufficient heat to destroy bacteria; and, thus permits sewage sludges to be made use of promptly, instead of being held for digestion and diminishment as is customary.

The invention also comprises other desirable steps and various novel structures; and as a whole, as well as in detail, will be readily understood on reference to the accompanying drawings:—in which,—

Fig. 1 is a sectional detail which diagrammatically illustrates the actions that take place at the before-mentioned disengagement surface, which is presented at the juncture of the natant and sub-natant liquids;—Fig. 2 is a sectional elevation of a complete apparatus to be employed in and illustrating the invention;—Fig. 3 is a vertical section illustrating a novel tank for the treatment of large volumes of sewage, or other waste liquids, in accordance with this invention;—Fig. 4 is a plan view thereof;—Fig. 5 is a sectional detail, taken at the side of the tank and showing how the bottom scrapers are adjustably supported at their outer ends;—Fig. 6 is an enlarged detail better illustrating the adjustable support belonging to the inner ends of said scrapers;—Fig. 7 is like unto Fig. 5, but shows how the spraying device and the sludge pump are supported and moved about the top of the tank;—Fig. 8 is an enlarged section of one of the spray pipes, on the line 8—8 of Fig. 7; —and Fig. 9 illustrates the application of the invention to a two story tank which, incidentally, is used for the collection of valuable gases.

The dominating essence of this novel process will best be comprehended upon reference to Fig. 1. Therein the aforesaid sub-natant liquid, which is composed of purified or captured influent, is marked "water". The above described natant liquid, the liquid of less specific weight, is marked "oil" and the above defined disengagement surface is indicated by the irregular horizontal line which is marked D. A part of the sedimentation tank which contains the liquids appears in Fig. 1, and is marked T.

The influent is made to appear in the form of relatively minute drops or globules widely distributed in the natant liquid and being of greater weight sinks therein at a rate which is proportional to the acceleration of the influent as it enters the natant liquid and likewise a rate or velocity proportional to the differing specific gravities of the natant and influent liquids.

As will be apparent from the nature of oil and water, the descent of the globules is perceptibly slower than would be their fall in free air; and, the globules are therefore cushioned or slightly retarded in their descent against the disengagement surface. Yet it remains true that in general it may be said that the fall of the influent is virtually unimpeded; only another liquid is interposed, and no solid bodies need be used to protract the fall or flow of the influent. The slightly deterrent action of the displaced natant liquid is sufficient to prevent the immediate penetration of the disengagement surface by the falling globules, and that seems to be all that is necessary.

The greater surface tension of the influent plays its immediate part in causing the influent to divide into and remain in the form of separate round drops, and obviously each drop or globule is completely covered by a coating of natant liquid.

The foreign substances carried by the individual globules of impure influent doubtless are most strongly attracted, or attractive, to the lighter fluid and tend to join and adhere to the coating.

In Fig. 1 the upper globules which are in the act of sinking in the oil or natant liquid are shown as completely round and are marked G. Two globules which have struck and nearly penetrated the disengagement surface D, are marked G', G', and the hemispherical globules marked G'' are such as have rebounded or returned to the surface D within the oil (natant body) and there await their moments of mergence. That merging is of like with like; and an attempt to illustrate the action will be seen in the open bottomed globule which is marked G'''.

The differing surface tensions of the several substances impose such restraint upon the merging (of like with like) that the pause of each globule at the common or meeting surface D, is momentarily definite; so much so as to be clearly and visibly perceptible when the process is conducted with a light oil and sewage in a transparent vessel.

In practice with sewage, either raw or concentrated, a common petroleum oil is effective; but obviously other oils, greases or lighter liquids which remain fluid at ordinary temperatures and float on water may be substituted. For sake of brevity the natant liquid will hereafter be termed oil and the influent and the sub-natant body will be referred to as water.

A moment is consumed in the bursting and disengagement of the envelope of oil at the disengagement surface D; that action being the result chiefly of the tensional effort of the differing fluids to lessen their superficial areas. Once the envelope breaks at the bottom, any heavy earthy substances contained by the globule may precipitate quickly and the water merges with the main body. A slight disturbance is created by the opening or bursting of each globule in this manner and the turbulence appears to be an aid toward the firm admixture of the lighter and organic substances with the contacting oil; and, through the action of the differing surface tensions, and aided by indifferent specific weights, the impurities have a tendency to remain coated with oil and to collect upon the surface of the sub-natant water. However the tension of the water is constantly at work; and soon, the gathering impurities are so completely deprived of contained water and become so agglomerated or compacted as to be heavier than the water. Thereupon the accumulations of solids sink quite rapidly, often in clouds (see G$^x$)—see Fig. 1—having much the same appearance as "mother" in vinegar; and obviously of vastly increased extent, compared with the individual contributions which compose them. Such filmous precipitants comprise both the coarser particles of sewage and the ordinarily non-settleable and colloidal solids. The constituent oils, greases and fats of the sewage and particles, which in themselves lack the weight of water, either merge with or are retained at the disengagement surface and indeed actually mat thereon and there remain until withdrawn, or until they are weighted by and sink with the heavier substances.

It may seem anomalous or paradoxical to speak of dewatered substances while those substances are afloat in or at rest at the bottom of a body of water. Yet no better term suggests itself for the aggregated or individual particles which have lost so much of their liquid content to the opposed main bodies of oil and water. It is quite as though the more bulky appearance which is possessed by a quantity of fresh sewage sludge had been changed by "liquefaction" or by the squeezing out of the water.

The exact extent to which the reduction of sludge volume proceeds in this process has not been determined, but the important matter of agglutinating or consolidating the finely subdivided impurities from sewage has been demonstrated; and, is of great significance in the art of purifying waste waters of all kinds.

The top of the sub-natant water is deeply covered with oil and as will at once be understood the oil seals it against the atmosphere. A natant liquid of determined germicidal value has a beneficial effect in destroying bacterial life in the sewage and in any event such life as continues in the reduced and precipitated sludge must be limited to bacteria which are capable of development under anaerobic conditions. Such conditions appear the best when the manufacture of gas or fertilizer is in question and herein provision is made therefor, but generally this invention contemplates the removal of the sludges as rapidly as they accumulate at the bottom of the body of water and particularly the prompt exposure of the dewatered sludge to a high temperature, which definitely terminates bacterial life. Most conveniently, and as indicated in Fig. 2, the heat is applied by means of a series of hot rolls and the sludge either alone or mixed with other materials is profitably converted into paper which may be utilized agriculturally as ordinary mulch papers are used.

Fig. 2 represents a complete sewage disposal system embodying this invention. Starting with a sedimentation step, as indicated by the basin 2, the watery sludge is elevated to a spray head 3, or the like. That subdividing device is positioned above the oil in the top of the tank 4 and delivers many jets toward the surface of the oil. Due in part to the tension of the intervening air, the jets are broken up into incipient or complete drops and, in any event, the sludge is widely distributed as it penetrates the exposed surface of the oil; and thus in the condition of a great number of globules, the watery sludge descends to the disengagement surface D offered by the underlying body of water. The process at 1 that point or level occurs as above described. Some part of the impurities remain in the oil. The balance gradually sinks to the bottom of the tank. Agglomeration of the impurities upon the disengagement surface, D, may be aided by imparting a slow rotation to the whole body of liquid, as by means of an externally powered propeller 5, working within the water. A compensating decantation of water takes place through an inverted central funnel 6 and the valved pipe 7, the latter leading to a waste conduit 8. A gage glass, 9, and the valve 7' in the pipe 7 make it an easy matter to hold the disengagement surface, D, at a proper level. Dirty oil may be withdrawn through the top drain 10 or through the lower surface drain 11. Ordinarily the oil will be utilized by burning it under a steam boiler 12, as indicated by the valved connection 11'. The sludge from the bottom of the tank, in either fresh or digested condition, is hydrostatically ejected, in controlled quantity, through a valved pipe 13 and is delivered to the screen belt 14 of a paper making machine. As indicated by the hopper 15, other materials may be added before the stock enters the first pair of rolls 16. As is usual, the paper making machine is made up of many such pairs, some or all of which are heated internally by high pressure steam, conveniently supplied by the boiler 12. The resulting paper-like product should have considerable agricultural value. It may be rolled, or cut into sheets as here indicated. Should an oily constituent prove desirable it may be furnished through the branch of the oil sludge pipe 11. The part 17 represents a source of fresh oil from which the body in the tank 4 may be replenished.

So-called thickeners or circular settling tanks which discharge the effluent at the periphery, may advantageously employ this invention, but as shown in Figs. 3 and 4 must embody means for entrapping the body of oil upon the underlying body of water. Such modified thickeners may be very shallow, even shallower than is common, this being made possible by the process of the present invention. Further, they may be of large diameters and hence present top surfaces which are adequate for the reception of great volumes of the liquid to be purified. An idea of the maximum capacity of devices employing this invention may be gained by visualizing the surface of the oil as it would appear if it were receiving a heavy downfall of rain so that practically every part of the extensive oil surface were being wetted. Further, it will now be apparent that as means are here provided to arrest the flow of influent and to separate the impurities before they can enter the underlying body in a diffused state, the actual capacity of the new tank is not limited to a rate of flow which will permit the settlement of finely subdivided impurities within the water; and that with proper means for intercepting sludge at the bottom of the tank, the overall rate of flow through the tank may greatly exceed, in comparison, the rates hitherto found practicable in thickeners of corresponding diameters.

These new thickeners may be arranged to evacuate the condensed or agglomerated sludge either at the center as is usual or at the periphery. The latter procedure is preferred and is indicated in Figs. 3 and 4. The special advantages thereof will presently appear.

Typically, such a modified separating or sedimentation tank comprises a shallow circular pool 18 which has a convex conical bottom 18' preferably characterized by a central enlargement 18". The latter provides the step or anchorage for a short vertical mast 21 which rises through the center of the tank. The bodies of oil and water are plainly marked in Fig. 3; likewise the disengagement surface D; and it will be seen that the oil is entrapped within a circular wall 19 which descends to a point or level 19" which is considerably below the disengagement surface D. The wall 19 is concentric with the central mast 21 and preferably concentric with the vertical wall of the tank 18. It is supported by a plurality of legs 19' rising from the bottom of the tank and thereby a free circumferential space 18ª is provided at the periphery of the tank, outside of the wall 19. A spider, which comprises the circular member 20, the spokes 22 and the basin-like hub 23, is supported upon the top of the mast 21 and by a circular rail 19ª at the top of the circular wall 19. The member 20 contains many small wheels 20' which roll upon the rail or rim of the part 19, and as the bearing upon the mast opposes little resistance, the spider may be rotated by the application of very little force, if applied to the member or rim 20 of the spider. Indeed, in some cases the wheels at the rim of the spider may be discarded and the whole weight of the spider and scrapers may be directly supplied by the fixed central mast.

Preferably the hub 23' of the basin 23 is loosely mounted upon the top of the mast by an antifriction bearing 24. Preferably also the hub 23' is equipped with an adjusting screw 25 by which it may be slightly raised and lowered to relieve strains in the spider, and more particularly to the end that certain scrapers 26 which sweep the bottom 18' may be properly raised and lowered. The inner ends of the scrapers are attached to relatively advanced or angular arms 27 that extend from the lower end of a sleeve 23" which is vertically movable with the basin or hopper 23. The outer ends of the scrapers are drawn along by the movement of the spider upon the top of the oil trap, being connected with the spider by rods 28 which hang from adjustable fastenings 29 provided on the rim 20 of the spider.

Conveniently the influent enters the basin 23 through the slightly elevated pipe or main 30. The inner end of the pipe 30 has a bracket 30' socketed to rest upon the upper end of the hub 23', that is, upon the upper end of the adjusting screw 25 therein. Thus the central mast 21, which is a rigid and dependable fixture, is made to carry much of the weight of the scrapers, the spider and the supply pipe. Wide arches are avoided and the whole structure becomes easy to construct and is of less cost than the corresponding parts of other so-called thickeners.

Most conveniently the spokes 22 of the spider are simple pipes or troughs which communicate with the interior of the basin 23 and have their outer ends stoppered by the rim 20, as indicated at $a$ in Fig. 7. It follows that the pipes 22 may contain many perforations 22', and being fed with influent from the basin become a means for reliably spraying the influent upon the surface of the underlying body of oil. However the invention is not limited to such a spraying device.

Most conveniently the rim rail, through the medium of the rim 20, and a contact rail 31 (see Fig. 7) support a bracket 32 upon which is mounted a motor 33 (see Fig. 7) for rotatively propelling, as desired, the sprayer and a motor driven pump 34. The suction pipe 35 of that pump extends downward within the space 18ª and quite to the bottom of the peripheral, lower corner 18'' of the tank. By means of the pump 34 the sludge may be withdrawn from the corner of the tank at any time, and such withdrawal is made progressive by the rotative movement of the pump entirely around the open circular space or channel 18a. The customary peripheral trough 36 surrounds the top margin of the wall 18 and serves to carry away the unburdened or purified effluent which overflows therefrom.

The structure illustrated in Figs. 3 to 8 possesses marked advantages which result in the slight weight, the low cost and the visibility of the described arrangement of scrapers, spider and sprayer. The spokes 22 are not difficult to clean if they become clogged, and when desired may be U-shaped or open-topped instead of having closed tops as herein shown.

The process of separation as conducted with the aid of the oil stratum in the tank of Fig. 3 is the same as before described and need not be reiterated.

Fig. 9, which illustrates the application of this invention to a two story digestion tank, is chiefly self-explanatory. As before, the layers of oil and water are plainly marked in Fig. 9. Aside from the oil, the chief differences over present two story tanks reside in the arrangement of a sprayer 37 above the oil and in the arrangement of an effluent outlet 38 centrally within the body of water. The internal or sedimentation tank 39 is open at the bottom and is provided with a gas excluding trap 40. The sludge digesting compartment 41 rises at the sides of the tank 34 and has a closed top 42 for the collection of gas; which gas departs through the pipe 43. A valved pipe 44 leading from the bottom of the compartment 41 provides for the hydrostatic ejection of inodorous sludge into a convenient hopper or pocket 45.

Under this invention the digesting compartment 41 is supplied with a sludge in the above-described dewatered condition; and further as oxygen is excluded by the overlying body of oil all conditions would seem to be ideal for the rapid anaerobic digestion and gasification of the sludge.

When considerable quantities of fats are intercepted by the described bodies or layers of oil, it will be found profitable to subject the oil to occasional treatments which result in the recovery of the fats.

This process and the novel devices herein disclosed will be found useful in many arts other than sewage disposal, and are intended for such extended uses. Particular attention is directed to the separation of oil and water; to the purification of water in general; to the pulp paper industry; to the various industries employing gas washing waters; and to the mining industries.

Still further modifications of the structure not requiring illustration but suggested by the disclosures of this specification, are embraced by this invention; as will become apparent upon reference to the appended claims.

I claim:

1. That treatment of sewage, sludges and like organically defiled carrying liquids, which consists in subdividing and permitting them to fall within a body of mineral oil natant upon a previously collected and substantially quiet subnatant body of carrying liquid and thereby causing a separation of the impurities of the carrying water and the agglomeration thereof, at the juncture of the natant and sub-natant liquids.

2. That treatment of sewage, sludges and like organically defiled carrying liquids, which consists in subdividing and permitting them to fall within a body of mineral oil natant upon a previously collected and substantially quiet subnatant body of carrying liquid, thereby causing a separation of the impurities of the carrying water and the agglomeration thereof at the juncture of the natant and sub-natant liquids, protracting the retention of the impurities until certain thereof become heavy enough to sink in the subnatant liquid.

3. That treatment of sewage, sludges and like organically defiled carrying liquids, which consists in subdividing and permitting them to fall within a body of mineral oil natant upon a previously collected and substantially quiet subnatant body of carrying liquid, thereby causing a separation of the impurities of the carrying water and the agglomeration thereof at the juncture of the natant and sub-natant liquids, protracting the retention of the impurities until certain thereof become heavy enough to sink in the sub-natant liquid, and thereafter removing the compacted sludge from the latter.

4. That treatment of sewage, sludges and like organically defiled carrying liquids, which consists in subdividing and permitting them to fall within a body of mineral oil natant upon a previously collected and substantially quiet subnatant body of carrying liquid, thereby causing a separation of the impurities of the carrying water and the agglomeration thereof at the juncture of the natant and sub-natant liquids, protracting the retention of the impurities until certain thereof become heavy enough to sink in the sub-natant liquid, and thereafter withdrawing a portion of the natant liquid with a burden of impurities.

5. That treatment of sewage, sludges and like organically defiled carrying liquids, which consists in subdividing and permitting them to fall within a body of mineral oil natant upon a previously collected and substantially quiet subnatant body of carrying liquid, thereby causing a separation of the impurities of the carrying water and the agglomeration thereof at the juncture of the natant and sub-natant liquids, protracting the retention of the impurities until certain thereof become heavy enough to sink in the sub-natant liquid, and thereafter withdrawing a portion of the natant liquid with a burden of impurities and also removing the compacted sludge from the subnatant liquid.

6. The treatment of sewage, and the like, that consists in subdividing and permitting the influent sewage to fall within a body of mineral oil of less specific gravity and at the bottom thereof permitting the products to meet a previously collected and substantially stable body of influent liquid which directly supports the oil, thereby causing the impurities to disengage from the falling influent and to agglomerate at the juncture of the two bodies.

7. That treatment of sewage and the like which consists in subdividing and permitting the sewage to fall within a stratum of mineral oil which floats upon a previously collected body of water and thereby causing the impurities to disengage from the sewage and agglomerate at the meeting surface common to the oil and sub-natant water.

CHARLES GILBERT HAWLEY.